(No Model.) 7 Sheets—Sheet 1.

G. J. NETH & J. B. AUFULDISH.
LABELING MACHINE.

No. 585,282. Patented June 29, 1897.

(No Model.)  7 Sheets—Sheet 2.

G. J. NETH & J. B. AUFULDISH.
LABELING MACHINE.

No. 585,282.  Patented June 29, 1897.

Fig 2.

Witnesses.
I Longenecker.
A. J. Fiorini

Inventors
Geo. J. Neth, and
Jno. B. Aufuldish.
By Attorney.
R. J. McCarty

THE NORRIS PETERS CO., PHOTO-LITHO., WASHINGTON, D. C.

(No Model.) 7 Sheets—Sheet 7.

G. J. NETH & J. B. AUFULDISH.
LABELING MACHINE.

No. 585,282. Patented June 29, 1897.

UNITED STATES PATENT OFFICE.

GEORGE J. NETH AND JOHN B. AUFULDISH, OF DAYTON, OHIO.

LABELING-MACHINE.

SPECIFICATION forming part of Letters Patent No. 585,282, dated June 29, 1897.

Application filed November 4, 1895. Serial No. 567,854. (No model.)

*To all whom it may concern:*

Be it known that we, GEORGE J. NETH and JOHN B. AUFULDISH, of Dayton, county of Montgomery, State of Ohio, have invented a new and useful Improvement in Labeling-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in labeling-machines of the class designed for labeling cylindrical articles—such, for example, as cans.

The object of the invention is to provide an improved machine, the novel features of which will be fully described in the annexed specification and set out in the claims.

Of the drawings hereto annexed and forming a part of this application, Figure 1 is a top view of our improved labeling-machine. Fig. 4 is a side elevation of the machine, parts being broken away and the driving-shaft appearing in section. Figs. 10, $10^a$, 11, and 12, Sheet 1, are detached detail views of the clutch devices operating in connection with one of the can-grippers. Figs. 13 and $13^a$ are detached views of the cam-ring operating in connection with the can-grippers.

In the following specification similar reference-characters indicate corresponding parts.

1 indicates the various parts of the supporting-frame.

2 is the driving-pulley, and 3 is the main shaft, which is suitably journaled in bearings in the frame.

Figures 1, 10, 10A, 11, 12:
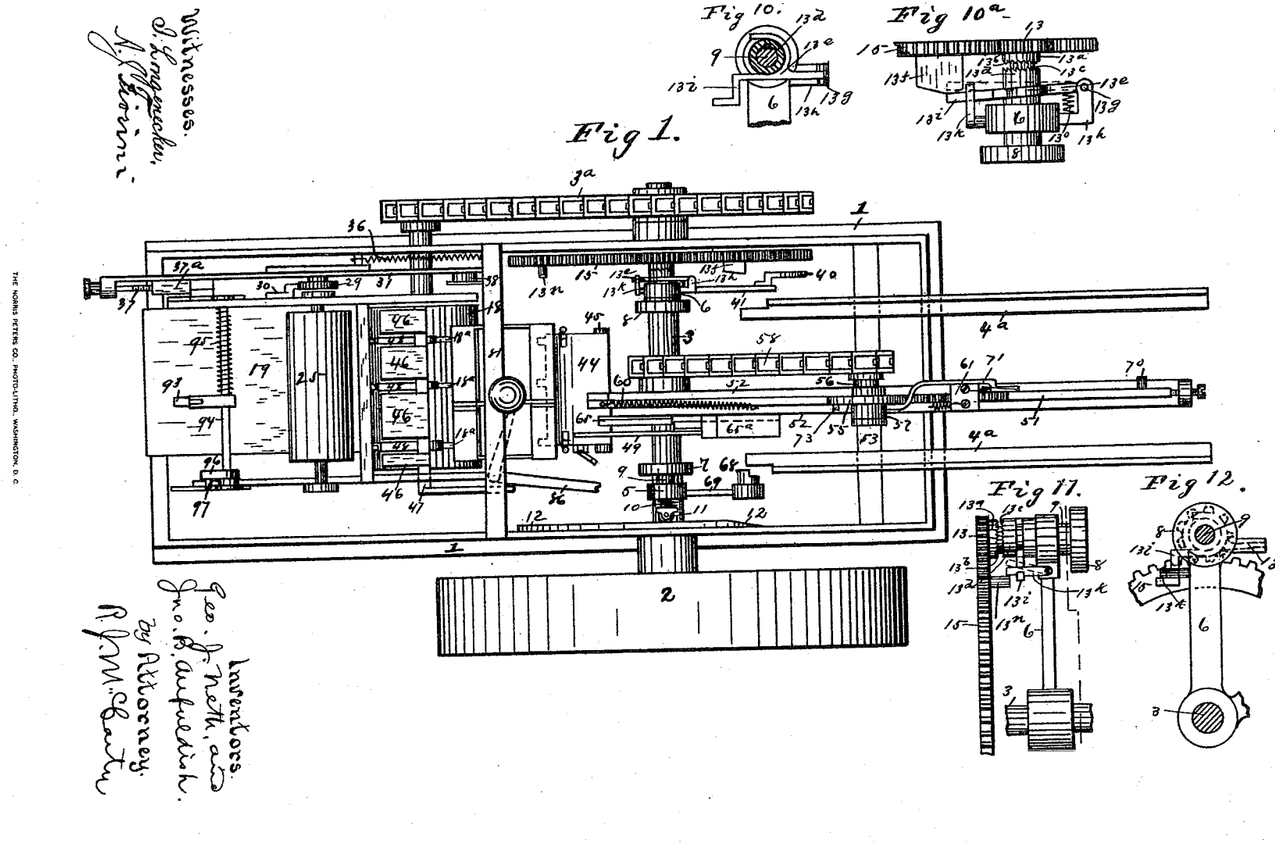
Figure 2:
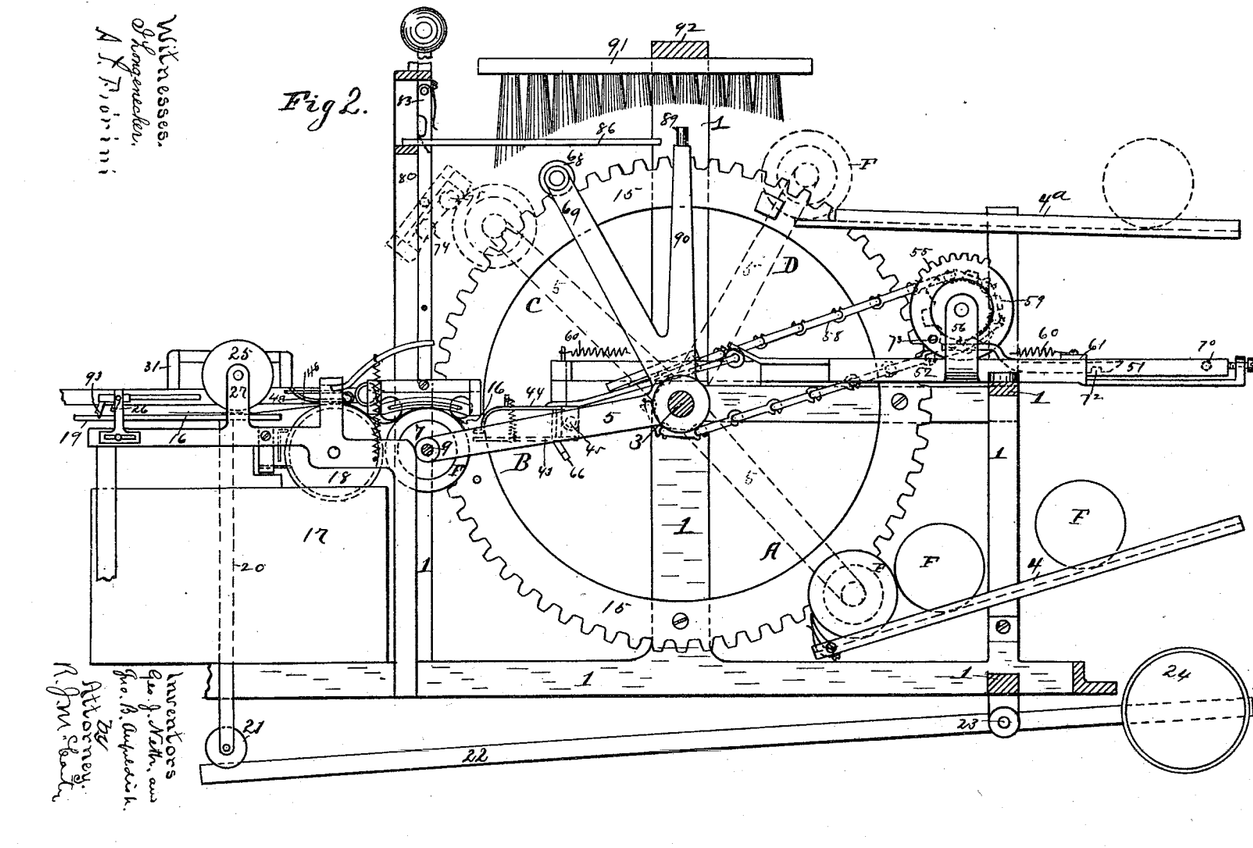
Fig. 2 is a partial sectional elevation.

4 and $4^a$, Figs. 1 and 2, indicate, respectively, the can-tracks.

5 and 6 designate arms rigidly mounted on the revolving shaft 3, and on the outer ends of which there are mounted clutches or can-grippers 7 and 8. These grippers have short shafts 9, that are mounted to revolve in their bearings in the ends of said arms. The former—to wit, 7—has a coil-spring 10 around its journal, that normally presses it horizontally and outward, and an antifriction-roller 11 is mounted on the outer end of said shaft, that rides upon a cam-ring 12, secured against the inner side of the case or frame. (See Figs. 1 and 13.) The other one of said can-grippers—to wit, 8—has an intermittent rotary motion through a pinion 13 on a sleeve $13^a$, which incloses the shaft 9 of the can-gripper 8. The sleeve $13^a$ has teeth $13^b$, that are adapted to engage with similar teeth $13^c$ on a sleeve $13^d$, that is splined to the shaft 9.

It will be noted that the gripper 7 is subjected to both an axial and rotary movement. Gripper 8 has only a rotary movement and that when the teeth $13^b$ and $13^c$ are engaged. The release and engagement of these teeth are accomplished by shifting devices, (shown in Figs. 10, $10^a$, 11, and 12,) and consist of a shifting fork $13^e$, that surrounds the sleeve $13^d$. One end $13^i$ of said fork is extended into the path of a lug $13^f$ on the side of a spur gear-wheel 15, that is fixed to the side of the frame. This wheel 15 meshes with the pinion 13. The shifting fork $13^e$ is pivoted at $13^g$ to a bracket $13^h$, which is carried on the arm 6.

$13^k$ designates a catch attached to the bracket $13^h$ and in which the extended end $13^i$ of the shifting fork may be secured. As this clutch mechanism is carried around on the arm 6 the lug $13^f$ comes in contact with the end $13^i$, as shown in Fig. $10^a$, and presses the sleeve $13^d$ out and said end $13^i$ in engagement with the catch $13^k$. A continued movement of said arm 6 brings the catch $13^k$ in contact with a pin $13^n$ on the wheel 15, which forces said catch away from the end $13^i$ of the shifting fork and permits the sleeves $13^d$ and $13^a$ to lock with each other under the pressure of a helical spring 13°, which presses against the fork.

Referring to Fig. 2, the arms 5 and 6 are shown in full and broken lines in four different positions—to wit, A, B, C, and D. The first position is that in which the grippers 7 and 8 are open and receiving a can F from the incline 4. The laterally-movable gripper 7 is off of the cam-ring 12, and the gripper is opened under the expansion of the coil-spring 10. The said gripper 7 instantly closes by the roller 11 mounting the ring 4. The arms next bring the can to position B, where it receives a label 16, which has previously been placed in position by mechanism to be hereinafter described. When the can is brought to this position, it begins to revolve by the clutch mechanism coöperating with the gripper 8, as hereinbefore described, and continues to revolve, wrapping the label around it until the grippers reach position D, when the labeled can is deposited to the upper or delivery track 4ª. At this point the roller 11 has left the ring 4, and thereby the gripper 7 is permitted to open and deposit the can. The lug 13ᶠ has also effected a disengagement of the sleeves 13ª and 13ᵈ, and the gripper 8 ceases its rotation.

Referring to the label-feeding mechanism, 17 designates a paste-trough; 18, a paste-roller mounted in the frame to rotate in said paste-trough and driven from the main axle 3 by a chain 3ª. 19 designates an adjustable label-holder containing a pack of labels 16. This holder or follower 19 is rigidly attached to the upper end of a vertical rod 20, the lower end of which has a roller 21, that rests upon the end of a weighted lever 22, that is pivoted to the frame at 23. The weight 24 serves to overbalance the weight of the labels and to keep said labels in contact with the feed-roller 25. The label-holder when in an operative position is inclosed by the standards 26 and 27 of the frame, which serve to keep them in position.

Figure 3:
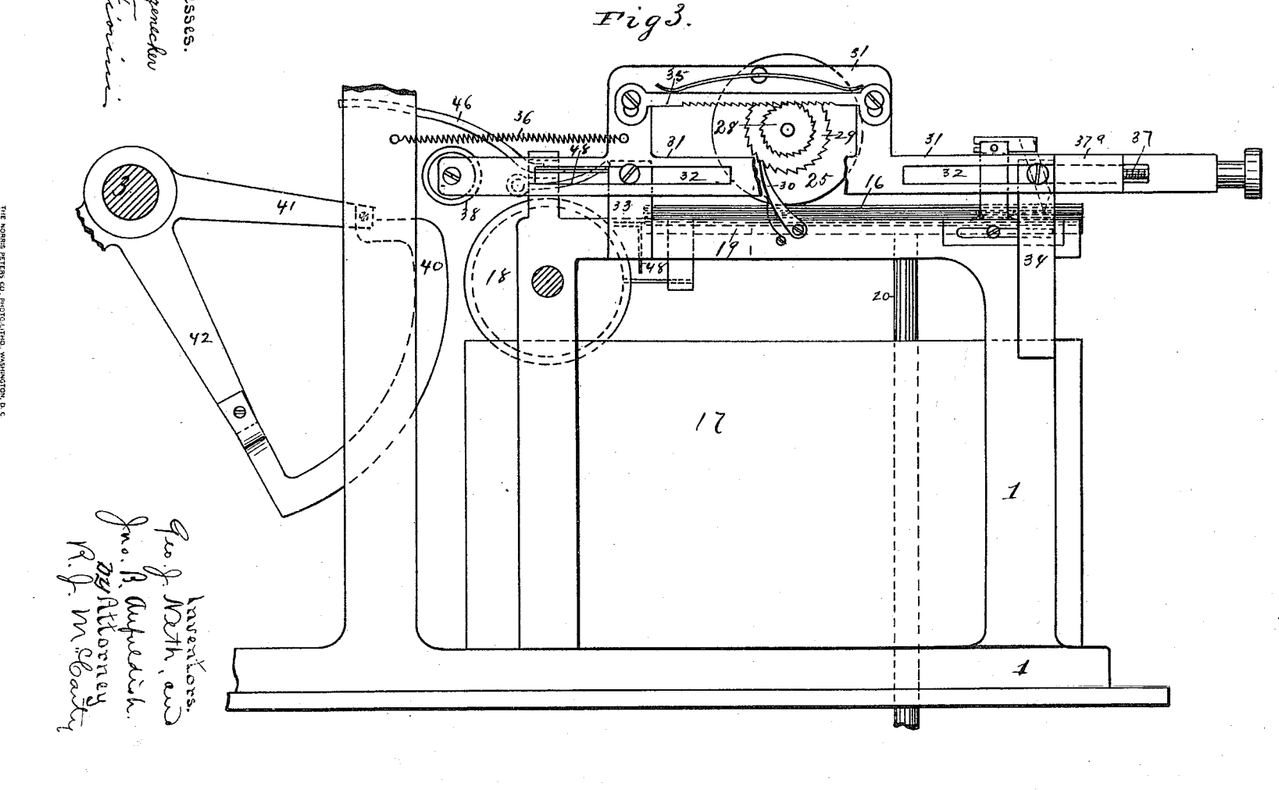
Fig. 3 is a partial sectional elevation of the part of the machine in which the label-feeding mechanism is located.

Referring to Figs. 1 and 3, 28 designates a ratchet-wheel keyed to the shaft of the feed-roller 25, and 29 designates a similar wheel also keyed to said shaft and with which a spring-pressed detent 30, pivoted to the frame, engages and prevents any backward movement of said feed-roller.

31 is a sliding frame provided with guide-slots 32, by which it is slidingly mounted on uprights 33 and 34, attached to the frame.

35 is a spring-pressed ratchet-bar mounted on an upwardly-extended portion of said slide and adapted to gear with the ratchet-wheel 28 to rotate the feed-roller.

The sliding frame 31 is maintained in a normal inward position by a helical spring 36, attached thereto and to the stationary frame.

37 designates a screw entering the curved outer end of said sliding frame and penetrating a block 37ª, attached to the frame. This screw enables a longitudinal adjustment of the said frame to bring its inner end into position.

38 designates a roller mounted on the inner end of said sliding frame. This roller normally lies in the path of a cam 40, carried on arms 41 and 42, that extend from the hub of the gripper-arm 6. As the main shaft 3 revolves this cam 40 is brought in contact with the roller 38, which drives outwardly the sliding frame 31, thereby rotating the feed-roller through the ratchet devices. This movement of the feed-roller 25 brings the label forward over the paste-roller 18 and delivers the front end of the label 16 to a position to be gripped by a pair of pincers consisting of members 43 and 44, hinged to each other at 45. The lower member 43 has a vertical stop 44ª attached to it, that prevents the end of the label from going too far into the pincers.

The paste-roller is provided with a series of circumferential grooves 18ª, that prevent paste from getting on the parts of the label that the pincers take hold of.

Figures 4, 13, 13A:
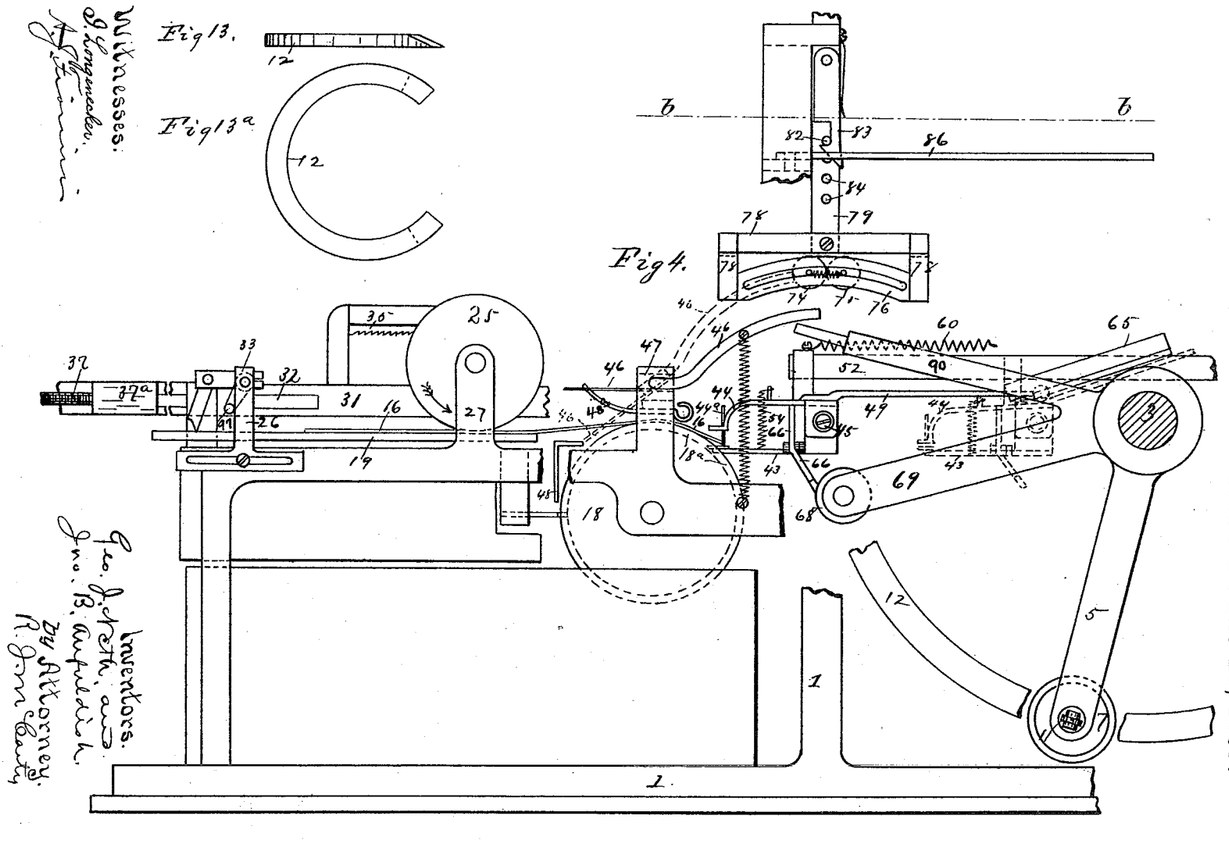

46 designates a series of upwardly-curved fingers suitably mounted in a transverse bar 47, attached to the frame above the paste-roller. These fingers are movable in unison to a position shown in dotted lines to press the departing ends of the labels against the paste-roller, as shown in Fig. 4. Movement is imparted to them by the rotating arm 90, as shown in broken lines, Fig. 4. These fingers 46 hold the label down on the roller to be pasted by being turned downward. This downward movement is imparted by the arm 90 coming in contact with the rearward-curved extension. Fig. 4 shows the arm 90 just below said extended portion of the fingers.

48 designates a transverse shield suitably mounted in the frame across the front of the paste-roller 18. This shield consists of an angle-piece, as shown in Fig. 4, and has a fixed or permanent attachment.

48ª designates a series of fingers rigidly mounted between the frame above the pasting-roller. These fingers serve to prevent the labels from rising from the paste-roller.

Referring further to the pincers 43 and 44, the upper member 44 has an extension or arm 49, upon which devices are mounted to be presently referred to.

50 designates a T-shaped piece to which the lower member 43 is rigidly attached, and said piece 50 passes through a slot in the upper member 44 and has its upper end rigidly secured to a sliding rack-bar 51, that moves in a horizontal guide 52, suitably mounted on a cross-piece 53 of the frame. 54 designates helical springs attached to said members 43 and 44, and exert a normal pressure to keep them closed.

55 is a segment-gear mounted on uprights 56 and 57, that rise from the guide 52, and meshes with the rack 51. The said segment-gear receives motion from the main shaft 3 through a chain 58 and a wheel 59 on the shaft of said segment-gear.

60 designates a helical spring attached to the inner end of the rack-bar 51 and to a cap 61, that is secured to the guideway 52 above the rack. This spring returns said rack-bar and the pincers to their normal outward position at the stated time, as will presently appear. The normal position of the pincers is shown in Figs. 1 and 2, also in Fig. 4 in broken lines.

62 designates a roller mounted on the arm 49, and 63 is a piece of sheet metal mounted on the journal of said roller and maintained in parallel position with the arm 49 by a wire detent 64, that is secured to said arm and presses on said piece 63. (See Figs. 7 and 8.)

Figures 5, 6, 7, 8, 9:
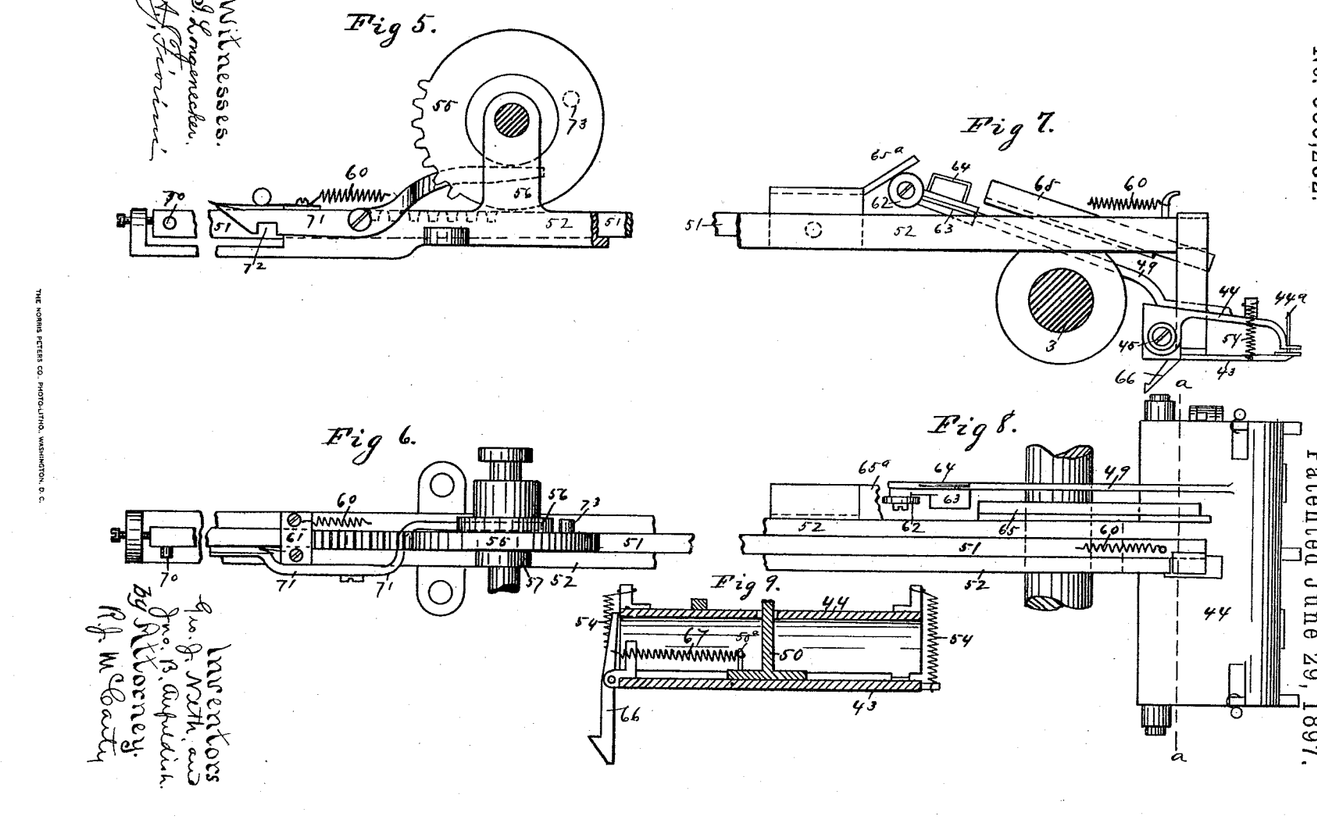
Figs. 5 and 6 are detached top and side views of rear portions of the label-gripping mechanism.
Figs. 7 and 8 are detached top and side views of the front portions of the label-gripping mechanism.
Fig. 9 is a section on the line $a\ a$, Fig. 8.

65 designates an angle-piece secured to a side of the guide 52 and forms an incline-guide beneath which the piece 63 passes as the pincers are being driven forward to grip a label. The pincers are thus opened, as they are advanced, by this incline-guide until they are opened sufficiently to allow the dog or lever 66 to be drawn under the upper member 44 of said pincers by the action of the helical spring 67, which is attached to said dog and to the piece 50ª. The dog 66 is pivoted to a side of the lower member 43, as shown in Fig. 9.

Fig. 4 shows the pincers advanced to a position to catch the end of a label, which is shown between said pincers. The said pincers are permitted to close upon the label by a roller 68, carried on an arm 69, that projects from the hub of the gripper-arm 5.

The pincers release the label when said pincers have reached the limit of their return movement, the positions shown in Fig. 2 and in Fig. 4 in broken lines. The opening of said pincers in this return movement is effected by the roller 62 and the piece 63 traveling upwardly under the guides 65 and 65ª, the latter of which is also secured to the guide 52. When the rack-bar 51 moves the proper distance for the pincers to receive a label, the said bar and the pincers are held stationary for an instant by means of a pin 70, that projects from a side of said bar, and a spring-controlled dog 71, pivoted to the guide 51. This dog has a notch 72, into which the pin 70 moves when the rack-bar has reached the limit of its inward movement. The said dog 71 is tripped to release the rack-bar by a pin 73, mounted on the gear 55.

Figures 14, 15:
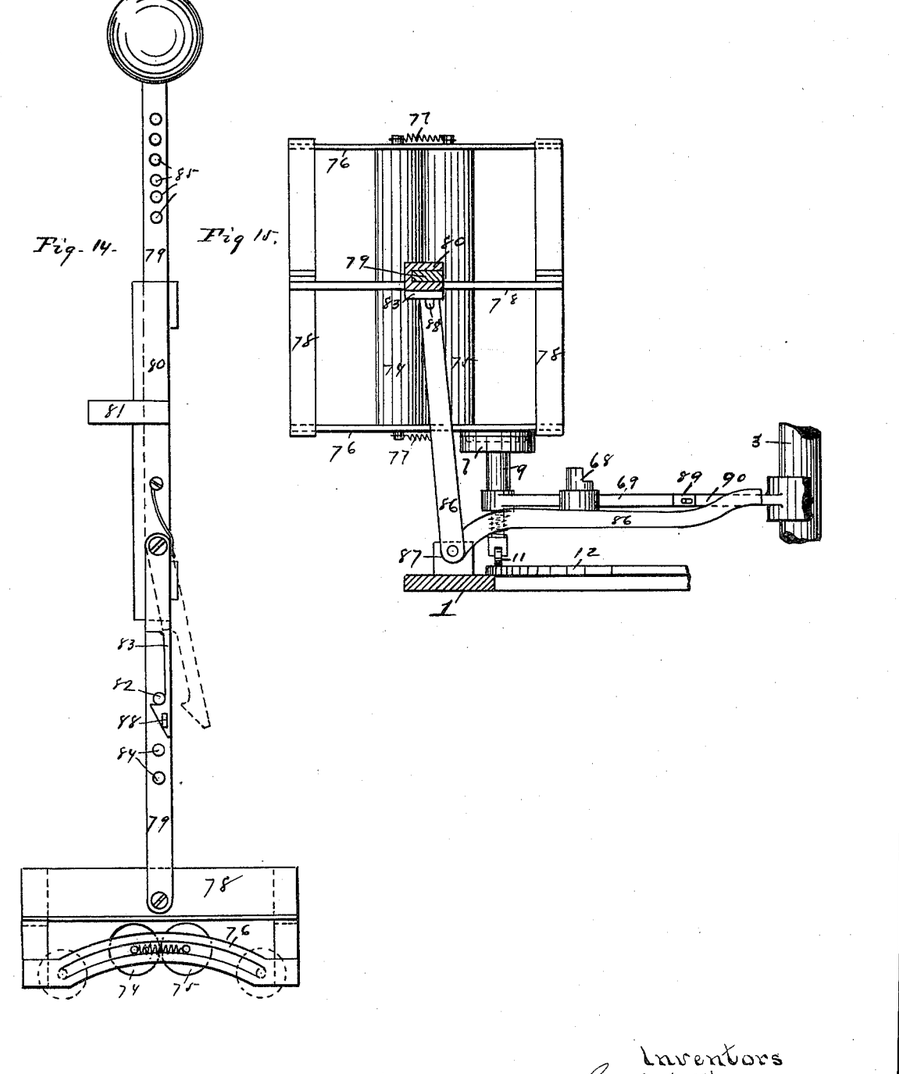
Fig. 14 is a detached view of the label-pressing mechanism.
Fig. 15 is a section of the label-pressing mechanism on the line $b\ b$ of Fig. 4.

74 and 75 designate two pressure-rollers that adhere the labels to the can when the latter is brought to position B and begins to revolve. These rollers spread apart when they strike the can, as shown in Fig. 2 and in dotted lines in Fig. 14. Their journals are mounted in slotted bearings 76 76 and are normally maintained together, as shown in Figs. 14 and 15, by helical springs 77 77, attached to said journals.

78 designates cross-pieces forming a frame, in which the roller-bearings are mounted.

79 designates a vertically-sliding bar, the lower end of which is centrally attached to said roller-frame. This bar moves in a guide 80, attached to a transverse bar 81, rigidly mounted on the frame. (See Figs. 1 and 14.) This bar 79 has a pin 82 on one side that engages with a spring-pressed latch 83, that is pivoted to the guide 80 and is supported in an elevated position until released.

84 designates openings into which the pin 82 may be placed to limit the extent of its elevation, and 85 are openings in which a pin may be placed to limit the drop of said bar. The said bar is released from its elevated position and the pressure-rollers permitted to drop by means of a bell-crank lever 86, which is fulcrumed on a projection 87 on the side of the frame. The inner end of said lever is slotted and straddles a projection 88 on the latch 83, and said latch is moved in and out thereby.

Movement is imparted to the lever 86 by a cam-lug 89, carried on an arm 90, projecting from the hub of the can-gripper arm 5. The said lug 89 comes in contact with the lever just as the can-grippers have reached the position B. The continued rotation of said grippers elevates the pressure-rollers 74 75 and passes clear thereof as position C is reached. (See Fig. 2.) The latch 83 then engages with the pin 82. The cans are subsequently brought in contact with a smoothing-brush 91, which is suitably mounted on a cross-piece 92, mounted on the frame.

In Figs. 1 and 4 there is shown a blade 93, attached to a shaft 94, and normally pressed into contact with the labels by coil-springs 95. The extent of the downward position of this blade is regulated by an arm 96, rigidly attached to the shaft 94, and a pin 97 on said arm that projects across the edge of the frame. The said blade is designed to prevent more than one label at a time from passing under the feed-roller.

Figure 16:
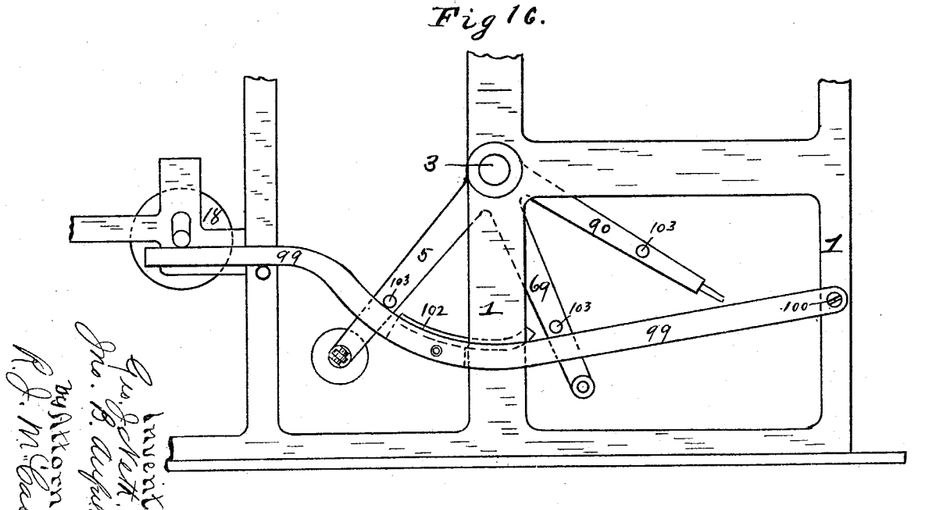
Figs. 16 and 17 are views of an attachment that may be used when it is desired to paste only the ends of the labels.
Figure 17:
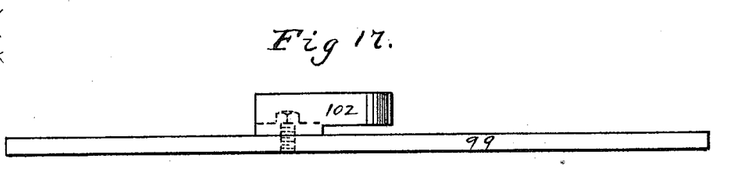

The above-described mechanism is in the main adapted for labeling cylindrical articles of a comparatively small diameter—such, for example, as baking-powder boxes. In labeling larger articles—such, for example, as tomato-cans—a saving of paste may be had by only pasting a portion of the labels—say at each end. There is shown in Figs. 16 and 17 an attachment for this purpose that may be placed on the machine. The said attachment provides means for elevating and lowering the paste-roller, so as to bring it in contact with the ends of the labels. The journals of the paste-roller are mounted in the slotted bearings 98 on both sides of the frame.

99 designates an angular lever, of which there is one on each side of the frame. The ends of these levers project below the journals of the paste-roller, their opposite ends are fulcrumed at 100 to the frame, and said levers are maintained in the normal position shown in Fig. 16 by pins 101, that enter said frame. 102 designates a curved plate that projects laterally from the inner sides of said levers. The said levers are tripped to elevate the paste-roller by means of pins 103 on the arms 5, 6, 69, and 90.

Having fully described our invention, we claim—

1. In a labeling-machine, the combination with the main driving-shaft, and a stationary spur gear-wheel, of arms rigidly mounted on said shaft, can-grippers mounted in said arms, a pinion, and clutch devices on one of said can-grippers, whereby it is subjected to an intermittent rotary movement, and a cam-ring adjacent to the other one of said can-grippers, whereby said grippers are enabled to seize a can, as herein specified.

2. In a labeling-machine, the combination with the main driving-shaft, and a stationary spur gear-wheel, of arms rigidly mounted on said shaft, can-grippers mounted in said arms, a pinion and clutch adapted to operate one of said grippers, a cam-ring adapted to operate the other of said grippers, reciprocating pincers adapted to draw a label in the path of the can carried by said grippers, guides to open said pincers as it advances to receive a label, and means for maintaining said pincers momentarily stationary and open, substantially as and for the purposes specified.

3. In a labeling-machine, the combination with a main driving-shaft, of can-grippers carried by said shaft, a cam-ring and a stationary spur gear-wheel adapted to impart axial and rotary movements to said grippers at predetermined periods, reciprocating pincers adapted to advance and receive a label while the grippers are carrying a can to a position to receive said label, pressure-rollers to fall upon the label when the can has been brought to a position to receive said label, a frame to which said rollers are attached, a vertically-sliding bar attached to said frame, and means for permitting said rollers to come in contact with the label, substantially as and for the purposes specified.

4. In a labeling-machine, the combination with the main driving-shaft, of pincers adapted to move in a horizontal plane to a position to seize a label, a rack-bar and segment-gear for actuating said pincers in the horizontal movement, guides for opening said pincers on their forward movement, and for permitting them to close upon a label, spreading pressure-rollers adapted to adhere a label, a vertically-moving frame on which said rollers are mounted, and revolving arms mounted on the main shaft and adapted to automatically seize a can and to carry it to a position to receive a label, and arms on said main shaft adapted to actuate devices for permitting the pressure-rollers to descend, substantially as described.

5. In a labeling-machine, the combination of a label-holder, a paste-roller 18 provided with circumferential grooves and adapted to rotate in a paste-vat, a feed-roller 25 to feed labels over and onto said paste-roller while the latter is rotating, horizontally-reciprocating pincers adapted to advance and seize each label so advanced over the paste-roller, and the oscillating fingers 46 adapted to descend upon the lap or rear end of the label and press it in contact with the paste-roller, substantially as and for the purposes specified.

In testimony whereof we have hereunto set our hands this 15th day of October, 1895.

GEORGE J. NETH.
JOHN B. AUFULDISH.

Witnesses:
FRANK M. HOWELL,
R. J. McCARTY.